United States Patent [19]
Anderson

[11] Patent Number: 4,815,801
[45] Date of Patent: Mar. 28, 1989

[54] KALEIDOSCOPES HAVING REMOVABLE AND REPLACEABLE DESIGNS

[76] Inventor: Kenneth J. Anderson, P.O. Box 468, Barrington, Ill. 60010

[21] Appl. No.: 108,107

[22] Filed: Oct. 13, 1987

[51] Int. Cl.$^4$ ............................................. G02B 23/00
[52] U.S. Cl. ..................................................... 350/4.1
[58] Field of Search .................... 350/4.1, 4.2; 40/364; 353/1, 2

[56] References Cited

U.S. PATENT DOCUMENTS

| | | | |
|---|---|---|---|
| 1,697,382 | 1/1929 | Burkard | 350/4.1 |
| 1,968,759 | 7/1934 | Gill et al. | 350/4.1 |
| 1,990,867 | 2/1935 | Harvey | 350/4.1 |
| 3,809,879 | 5/1974 | Gonzalez | 350/4.1 X |
| 3,953,104 | 4/1976 | Roitz et al. | 350/4.1 |

OTHER PUBLICATIONS

Ohio Art Commercial Brochure (1987), p. 3.
Ohio Art Commercial Brochure (1966), p. 2.
Village Toys Commercial Brochure (1985).
"Fascination of Tedco" (Commercial Brochure).

*Primary Examiner*—Richard A. Wintercorn
*Attorney, Agent, or Firm*—Willian Brinks Olds Hofer Gilson & Lione

[57] ABSTRACT

Various kaleidoscopic devices are provided which utilize removable and replaceable design inserts. The design inserts may be formed from a wide variety of artistic materials and may either be manufactured or prepared by the individual user. The use of these removable and replaceable design inserts greatly increases the viewing flexibility for the user by allowing a large number of designs to be viewed using a single kaleidoscope.

20 Claims, 3 Drawing Sheets

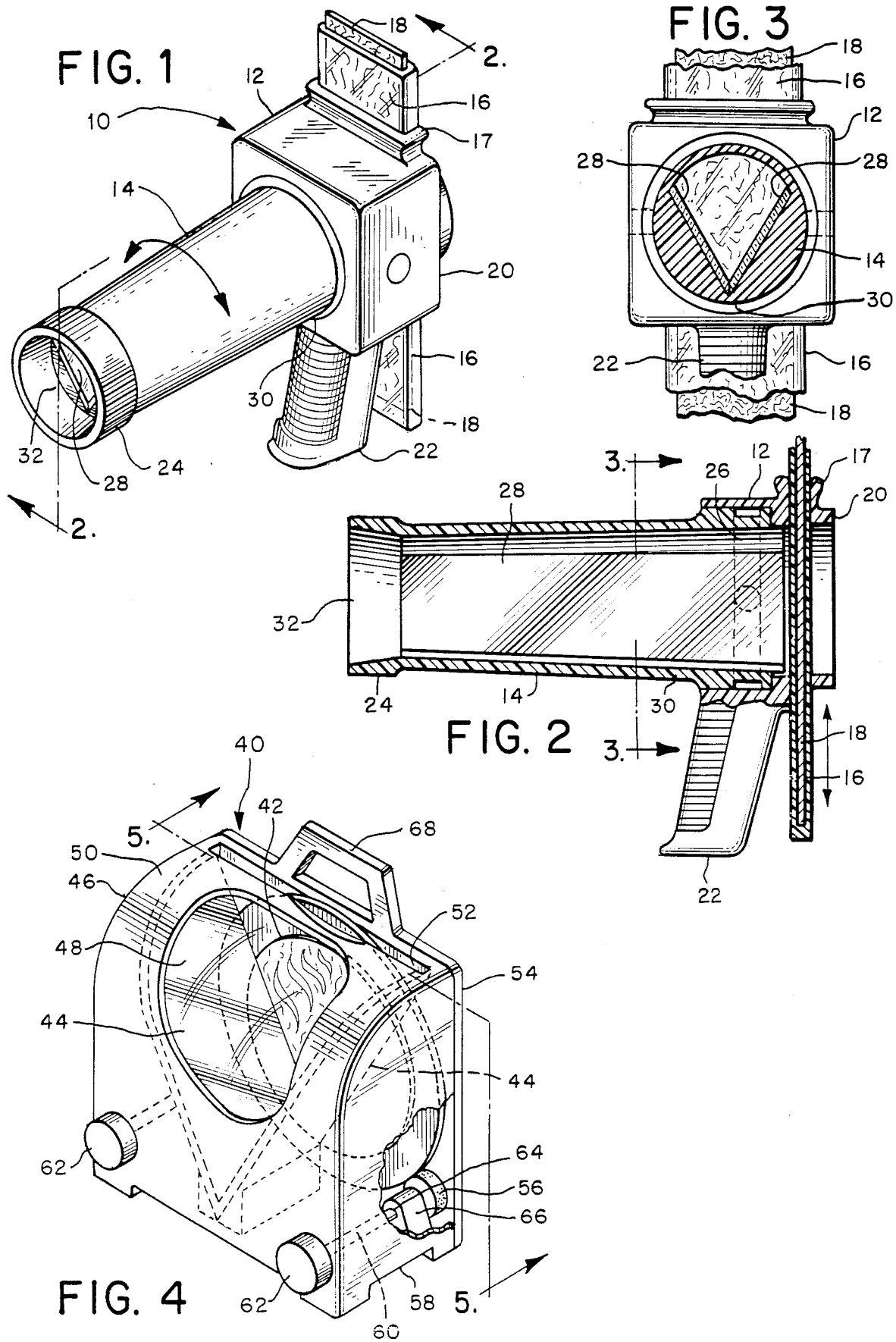

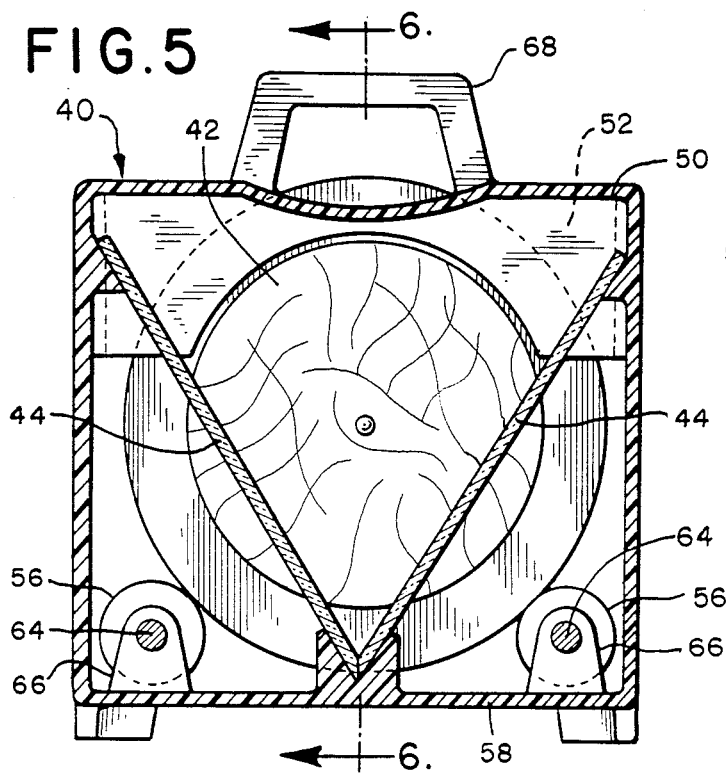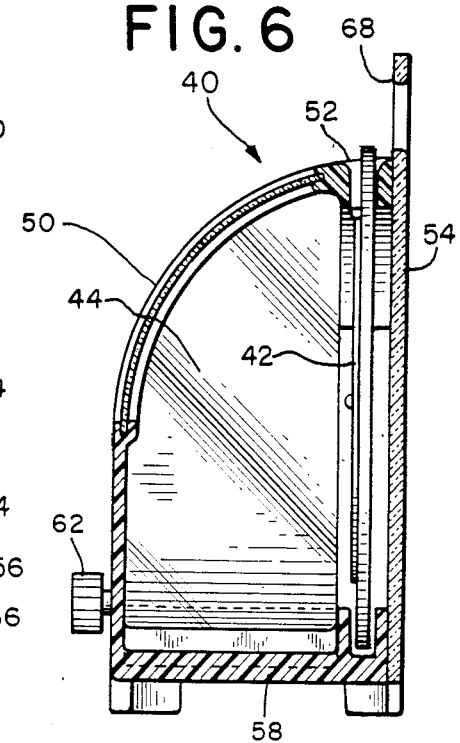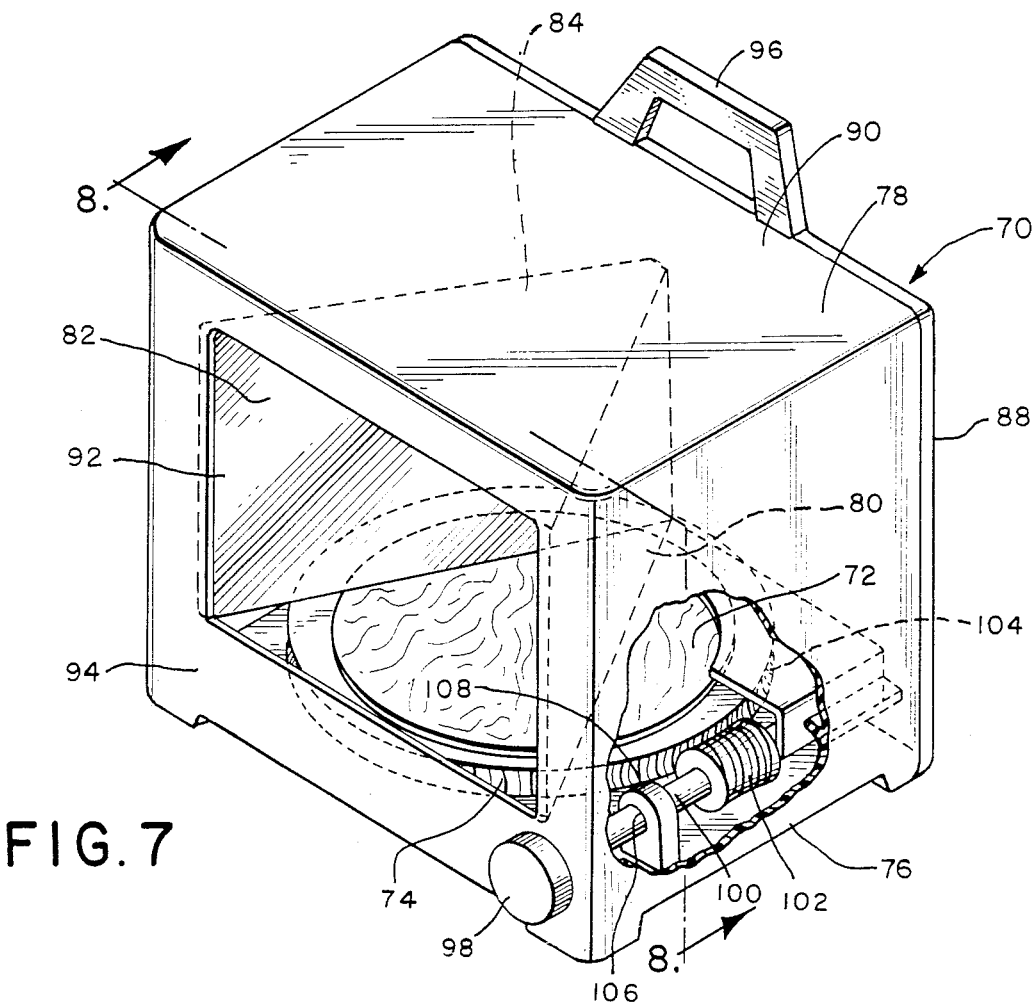

KALEIDOSCOPES HAVING REMOVABLE AND REPLACEABLE DESIGNS

FIELD OF THE INVENTION

This invention relates to kaleidoscopes having removable and replaceable designs which can be created by the user.

BACKGROUND OF THE INVENTION

Kaleidoscopic devices which use two or more mirrors to multiply a single image to a multiplicity of images (e.g. six or eight) are well known in the art. In one type of kaleidoscopic device, for instance, a plurality of rectangular mirrors are mounted in a longitudinal fashion around the periphery of a rotatable tube and reflect an image positioned at one end of the tube and viewed through an opening at the opposite end.

Many different varieties of kaleidoscopes are known in the art using different combinations and arrangements of mirrors, design, and viewing perspective. In some instances the mirrors are movable while in other instances the design is movable. Depending on how the mirrors are arranged, the design may be positioned parallel or perpendicular to the field of vision, or somewhere in between.

All of the prior art kaleidoscopic devices, however, are limited to a single design implanted by the manufacturer. None of these devices allows the user to interchange different designs or to prepare his or her own designs.

SUMMARY OF THE INVENTION

The present invention provides a variety of kaleidoscopic devices in which the user can both interchange different designs and can prepare his or her own designs. The designs can be in the form of substantially rectangular or substantially circular inserts which are held in a chamber within the housing of a kaleidoscope. These inserts may comprise a variety of different materials. In one embodiment, the insert is made of simple drawing paper onto which the operator can implant his own design using, for example, crayons or marking pens. Alternatively, an opaque or transparent reuseable marking surface may be used for utilizing temporary designs which can later be removed. The insert may also comprise two sheets of transparent plastic with paper cutouts positioned between them in a design fashion. In another embodiment, dark paper with selected cutout portions may be used to form a design insert.

The kaleidoscopes of the invention comprise means for moving the insert in a rotational direction (i.e. a circular insert) or a lateral direction (i.e. a rectangular insert) to create moving images within the housing. These motion means may either be manual (e.g. comprising a dial connected to rotating gears) or automatic (e.g. comprising an electric motor connected to rotating gears). If the design insert is circular, the motion means may be connected to a turntable onto which the design insert is positioned. The insert and/or turntable may be inside a circular chamber. If the design insert is rectangular, the motion means may be connected to a rectangular holder or chamber into which the design insert is removably placed.

The mirrors may be positioned in any manner relative to the design and the field of vision which creates multiple images of the design. Two mirrors are needed at minimum to create this effect, though three or more may be employed. The mirrors are positioned inside the housing of the kaleidoscope and generally intersect one another in a V-like fashion.

A light may be positioned inside the housing to allow viewing of the kaleidoscope in a relatively dark environment. The light may be positioned either underneath the design or along a wall adjacent to or opposite the design. A transparent window may also be positioned in one of the walls of the housing (preferably at the top) to allow external light to enter.

The present invention provides the user of kaleidoscopes with an enormous flexibility which was not available with prior art devices. By providing for removable and replaceable design inserts, the user can view a large number of design images with a single kaleidoscope. Until now, different kaleidoscopes were required for each different design. Furthermore, the prior art devices were completely manufactured and did not allow the user to create his own designs.

BRIEF DESCRIPTION OF THE FIGURES

FIG. 1 shows a perspective view of a kaleidoscope of the invention of a tubular variety which utilizes a substantially rectangular design insert movable in a vertical direction.

FIG. 2 shows a side cross-sectional view of the kaleidoscope of FIG. 1.

FIG. 3 shows a front cross-sectional view of the kaleidoscope of FIGS. 1 and 2.

FIG. 4 shows a perspective view of a kaleidoscope of the invention of a type which utilizes a vertically positioned substantially circular design insert and in which the design and mirrors are viewed from a top frontal perspective.

FIG. 5 shows a front cross-sectional view of the kaleidoscope of FIG. 4.

FIG. 6 shows a side cross-sectional view of the kaleidoscope of FIGS. 4 and 5.

FIG. 7 shows a perspective view of a kaleidoscope of the invention of a type which utilizes a horizontally positioned circular design insert and in which the design and mirrors are viewed from the front. A small section of the housing has been cut out to allow viewing of the inner workings.

DETAILED DESCRIPTION OF THE PRESENTLY PREFERRED EMBODIMENTS

Figure 8:
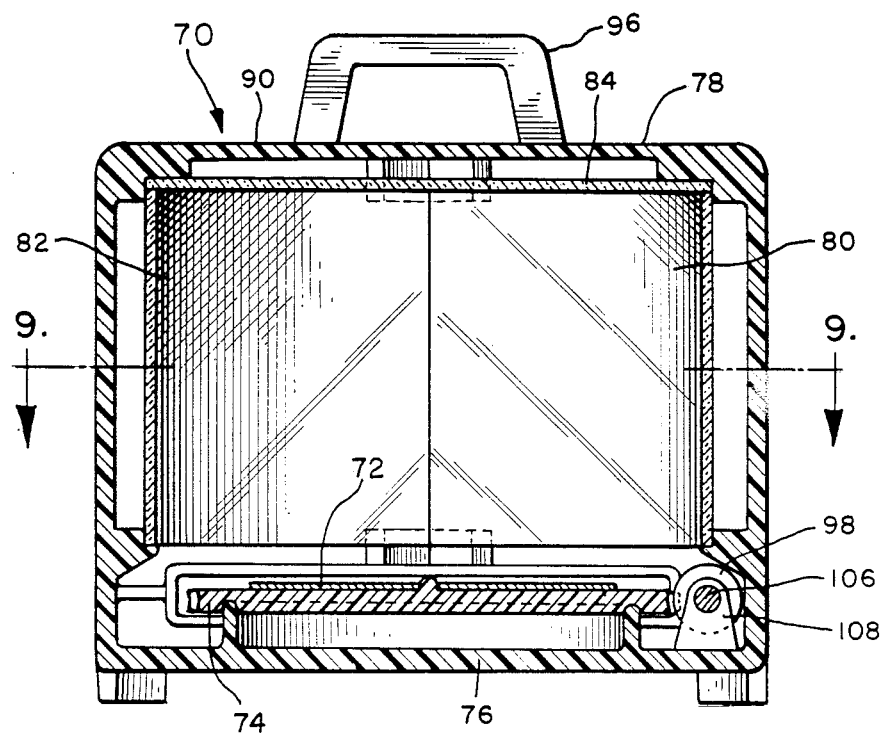
FIG. 8 shows a front cross-sectional view of the kaleidoscope of FIG. 7.

Referring to FIGS. 1, 2, and 3, a kaleidoscope of the invention of a tubular variety generally designated as 10 comprises a stationary outer housing and a substantially cylindrical inner housing 14 rotatable within the outer housing 12 and extending outwardly therefrom. A transparent rectangular chamber for receiving and holding a rectangular removable design disk 18 is positioned near a back end 20 of the housing 12 and is slidable in a vertical direction through a slot 17 perpendicular to the outer housing 12. A handle 22 is connected to the outer housing 12 for maintaining the kaleidoscope 10 in a horizontal viewing position. Two mirrors 28 are positioned in a V-like fashion inside the inner housing 14 intersecting at an angle of about 40–80 degrees, preferably about 60 degrees, near a bottom end 30 of the inner housing 14 and extending longitudinally between about the flange 24 and about the rectangular disk 16.

The design insert 18 and mirrors 28 are viewed through an opening 32 in the inner housing 14. The design insert 18 reflects upon the mirrors 28 such as to cause multiple images. By holding a flange 24 and turning it, the inner housing 14 can be rotated relative to the outer housing 12 to impart an appearance of motion to these multiple images. Furthermore, the image can be varied by sliding the chamber 16 which holds the rectangular design insert disk 18 in a vertical direction through the slot 17.

The design insert 18 can comprise a wide variety of materials. In one embodiment of the invention, the design insert may comprise standard drawing paper onto which a drawing is imparted by the user. The drawing paper is then held in a rigid fashion inside the transparent rectangular chamber 16. In another embodiment, the design insert 18 may comprise an opaque or transparent reusable marking surface onto which a design can be removably imparted by the user. The insert 18 may also comprise two sheets of transparent plastic with paper cutouts positioned between them in a design fashion. Dark or otherwise opaque paper with selected cutout portions may also be used to form a design insert 18. Other varieties of design inserts which are consistent with the spirit and scope of the invention are also possible. Two or more design inserts may be transposed upon one another inside the chamber 16.

FIGS. 4, 5, and 6 show a kaleidoscope of the invention, generally designated as 40, of a type in which a circular design insert 42 and the corresponding mirrors 44 are viewable from a perspective standpoint through an opening 48 in a housing 50. The circular design insert 42 can be of a rigid nature or alternatively can be placed inside a transparent rigid circular chamber (not shown). The design insert 42 (or the chamber) rests in a vertical position inside a slot 52 near a back end 54 of the housing 50 and on a pair of rollers 56 near a bottom end 58 of the housing 50. The two mirrors 44 are positioned in a V-shaped fashion inside the housing 50 and intersect at about a 60 degree angle near the bottom end 58 of the housing 50.

The opening 48 is in the form of a curvilinear cutout section in the top and front of the housing located at an angle opposite the design disk 42 and the intersection of the mirrors 44. This allows the design disk 42 and mirrors 44 to be viewed from an angular perspective. The rollers 56 which support the design disk 42 are connected by axles 60 to turning knobs 62. The axles 60 are supported by horizontal openings 64 formed in notches 66 located near the bottom 58 of the housing 50. By manipulating the turning knobs 62 either manually or electrically, the design disk 42 (or, alternatively, the transparent circular chamber holding the design disk 42) can be made to rotate, creating an appearance of motion in the images being viewed. A handle 68 is provided for holding the kaleidoscope in a viewing position.

The design disk 42, like the design disk 18 shown in FIGS. 1-3, can comprise a variety of materials including drawing paper, a reusable marking surface, paper cutouts positioned between transparent plastic sheets, or dark paper with sections cut out in a design fashion. Other varieties of design disks are also possible which are consistent with the spirit and scope of the instant invention.

Figure 9:
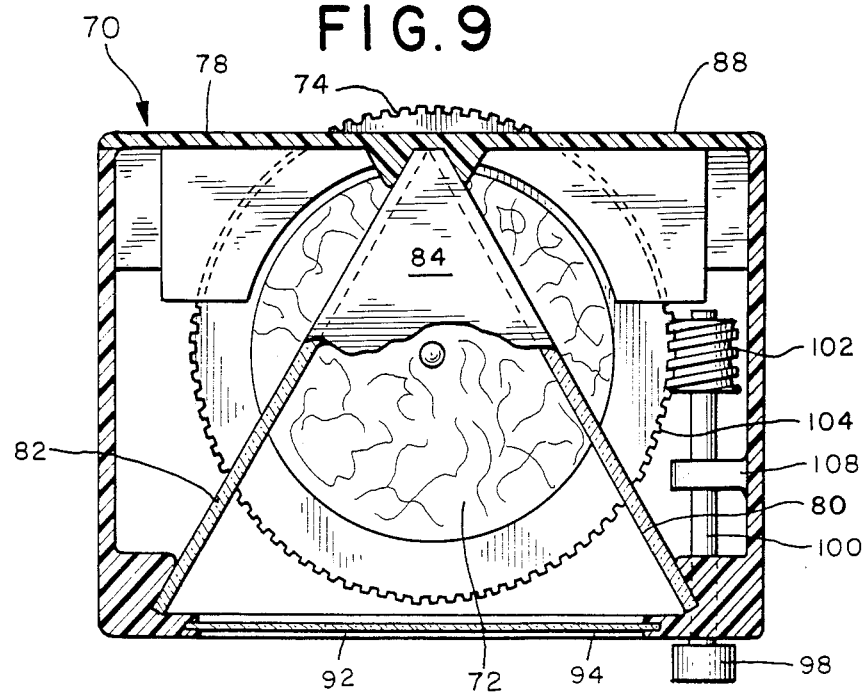
FIG. 9 shows a top cross-sectional view of the kaleidoscope of FIG. 7.

Referring to FIGS. 7-9, a kaleidoscope 70 of the invention is shown in which a substantially circular design disk 72 is positioned horizontally on a turntable 74 near a bottom 76 of the housing 78. Two mirrors 82 and 84 are positioned perpendicular to the design disk 72 intersecting at an angle of about 60 degrees near a back end 88 of the housing 78. A third mirror 86 is positioned near a top end 90 of the housing 78 and intersects the other two mirrors 82 and 84 in a substantially perpendicular fashion. An opening 92 is provided in a front end 94 of the housing 78 for viewing the design disk 72 and the mirrors 80, 82, and 84. A handle 96 is provided for holding the kaleidoscope 70 in a viewing position.

A means for rotating the turntable 74 is provided which comprises a dial 98 located on the front side 94 of housing 78 and connected by an axle 100 to a screw shaft 102 which is engaged to teeth 104 located on the outer periphery of the turntable 74. The axle 100 passes through and is supported within holes 106 located in notches 108 extending inwardly from the housing 78.

Again, the design insert 72 can comprise a variety of materials including drawing paper, a reusable marking surface, paper cutouts positioned between transparent plastic sheets, or dark or opaque paper with sections cut out in a design fashion.

Light can be added to the interior of the kaleidoscopes of any of the foregoing embodiments by utilizing windows in the housing (not shown) or light bulbs positioned either behind the design insert or adjacent to an interior wall of the housing (also not shown). Furthermore, the means for moving the design inserts can comprise automatic movement means as well as manual movement means. Finally, the number of mirrors and the angles between the mirrors can be varied in order to vary the number of multiple images created by the mirrors. Smaller angles between the mirrors cause higher numbers of images, as do higher number of mirrors.

While the embodiments described herein are at present considered to be preferred, it is understood that various modifications and improvements may be made therein, and it is intended that the appended claims cover all such modifications and improvements as fall within the true spirit and scope of the invention.

I claim:

1. A kaleidoscope comprising:
   a housing,
   a substantially flat support surface at an end of the housing for receiving and holding a removable design;
   first and second mirrors in the housing positioned in a V-like manner about perpendicular to the design, viewable through an opening in the housing; and
   means for moving the design in a continuous fashion to create moving images in the mirrors;
   the housing having an opening for viewing the design and the mirrors.

2. The kaleidoscope of claim 1 wherein the removable design comprises a substantially circular disk movable rotatably in a continuous fashion.

3. The kaleidoscope of claim 2 wherein the substantially circular disk comprises two transparent sheets bonded together and enclosing at least one paper cutout.

4. The kaleidoscope of claim 2 wherein the substantially circular disk comprises a reusable drawing surface for imparting removable crayon or marker sketches.

5. The kaleidoscope of claim 2 wherein the substantially circular disk comprises drawing paper.

6. The kaleidoscope of claim 2 wherein the substantially circular disk comprises dark paperboard with at least one opening.

7. The kaleidoscope of claim 2 wherein the substantially circular disk is positioned vertically at a back end of the housing.

8. The kaleidoscope of claim 2 wherein the substantially circular disk is positioned horizontally at a bottom end of the housing.

9. The kaleidoscope of claim 7 wherein the first and second mirrors intersect horizontally at an angle of about 60 degrees near a bottom end of the housing and wherein the housing has an opening formed by removing a curvilinear section from a front end and a top end of the housing for viewing the design and the mirrors from an angular perspective.

10. The kaleidoscope of claim 8 wherein the first and second mirrors intersect vertically at an angle of about 60 degrees near a back end of the housing comprising a third mirror near a top end of the housing about perpendicular to the first and second mirrors and connected thereto, the housing having an opening formed by removing a curvilinear section from a front end of the housing directly opposite the intersection of the first and second mirrors.

11. The kaleidoscope of claim 1 wherein the housing comprises a stationary outer housing and a cylindrical inner housing rotatable within the outer housing and extending beyond the outer housing opposite the chamber; and wherein the mirrors are positioned longitudinally inside the inner housing and intersect at about a 60 degree angle.

12. The kaleidoscope of claim 11 wherein the removable design comprises a substantially rectangular disk movable orthogonally in a continuous fashion perpendicular to the housing.

13. The kaleidoscope of claim 12 wherein the substantially rectangular disk comprises drawing paper.

14. The kaleidoscope of claim 12 wherein the substantially rectangular disk comprises at least one paper cutout.

15. The kaleidoscope of claim 12 wherein the substantially rectangular disk comprises a reusable drawing surface for imparting removable crayon or marker sketches.

16. A kaleidoscope comprising:
a housing;
a substantially flat support surface in the housing for receiving and holding a removable design in the form of a substantially circular disk positioned horizontally at a bottom end of the housing and movable in a continuous fashion;
first and second mirrors in the housing intersecting vertically at an angle of about 60 degrees near a back end of the housing;
a third mirror near a top end of the housing about perpendicular to the first and second mirrors and connected thereto; and
means for moving the design in a continuous fashion to create moving images in the mirrors;
the housing having an opening for viewing the design and the mirrors in the form of a cutout from a front end of the housing opposite the intersection of the first and second mirrors.

17. A kaleidoscope comprising:
a housing;
substantially flat support surface in the housing for receiving and holding a removable design in the form of a substantially circular disk positioned vertically at a back end of the housing and movable in a continuous fashion;
first and second mirrors in the housing intersecting horizontally at an angle of about 60 degrees near a bottom end of the housing; and
means for moving the design in a continuous fashion to create moving images in the mirrors;
the housing having an opening for viewing the design and the mirrors from an angular perspective comprising an opening in a front end of the housing directly opposite the intersection of the first and second mirrors.

18. A kaleidoscope comprising:
a housing having an outer housing and a cylindrical inner housing;
a substantially flat support surface at an end of the housing for receiving and holding a removable design;
first and second mirrors positioned longitudinally inside the inner housing and intersecting at about a 60 degree angle;
means for moving the design orthogonally in a continuous fashion in a direction perpendicular to the housing; and
means for rotating the inner housing relative to the outer housing;
the housing having an opening at an end opposite the chamber for viewing the design and the mirrors.

19. The kaleidoscope of claim 1 further comprising a chamber at an end of the housing for receiving and holding a removable design; said chamber comprising said substantially flat support surface.

20. The kaleidoscope of claim 1 wherein the substantially flat support surface comprises a reusable marking surface.

* * * * *

UNITED STATES PATENT AND TRADEMARK OFFICE
CERTIFICATE OF CORRECTION

PATENT NO. : 4,815,801
DATED : March 28, 1989
INVENTOR(S) : Kenneth J. Anderson

It is certified that error appears in the above-identified patent and that said Letters Patent is hereby corrected as shown below:

In column 2, line 55, after "housing" please insert --12--.

In column 2, line 58, after "chamber" please insert --16--.

Signed and Sealed this

Twenty-seventh Day of August, 1991

Attest:

HARRY F. MANBECK, JR.

*Attesting Officer*  *Commissioner of Patents and Trademarks*